United States Patent
Lachine et al.

(10) Patent No.: US 7,064,770 B2
(45) Date of Patent: Jun. 20, 2006

(54) SINGLE-PASS IMAGE RESAMPLING SYSTEM AND METHOD WITH ANISOTROPIC FILTERING

(75) Inventors: Vladimir Lachine, Toronto (CA); Gregory Lionel Smith, Toronto (CA); Louie Lee, Richmond Hill (CA)

(73) Assignee: Silicon Optix Inc., San Jose, CA (US)

( * ) Notice: Subject to any disclaimer, the term of this patent is extended or adjusted under 35 U.S.C. 154(b) by 0 days.

(21) Appl. No.: 10/939,044

(22) Filed: Sep. 9, 2004

(65) Prior Publication Data

US 2006/0050083 A1 Mar. 9, 2006

(51) Int. Cl.
*G09G 5/00* (2006.01)
*G09K 9/32* (2006.01)

(52) U.S. Cl. ............... 345/611; 345/619; 345/646; 345/647; 345/660; 345/665; 382/298; 382/299; 382/300

(58) Field of Classification Search ........ 345/611–619, 345/428, 646–647, 660, 665; 382/260, 263, 382/266, 298–300
See application file for complete search history.

(56) References Cited

U.S. PATENT DOCUMENTS

| 5,175,808 A | 12/1992 | Sayre |
| 5,594,676 A | 1/1997 | Greggain et al. |
| 6,005,582 A | 12/1999 | Gabriel et al. |

(Continued)

FOREIGN PATENT DOCUMENTS

| EP | 0920671 B1 | 10/1997 |
| WO | WO 97/39420 | 10/1997 |

OTHER PUBLICATIONS

Chen, B.; Dachille, F.; Kaufman, A. "Footprint Area Sampled Texturing". Vis. and Comp. Graphics, IEEE Trans. on. vol. 10, Iss. 2, Mar.-Apr. 2004, pp. 230-240.*
Zwicker, M.; Pfister, M.; van Baar, J.; Gross, M. "EWA Splatting." Visualization and Computer Graphics, IEEE Transactions on vol. 8, Issue 3, Jul.-Sep. 2002 pp.:223-238 □□.*

(Continued)

*Primary Examiner*—Michael Razavi
*Assistant Examiner*—Eric Woods
(74) *Attorney, Agent, or Firm*—Sughrue Mion, PLLC

(57) ABSTRACT

A method and system for circularly symmetric anisotropic filtering over an extended elliptical or rectangular footprint in single-pass digital image warping are disclosed. The filtering is performed by first finding and adjusting an ellipse that approximates a non-uniform image scaling function in a mapped position of an output pixel in the input image space. A linear transformation from this ellipse to a unit circle in the output image space is determined to calculate input pixel radii inside the footprint and corresponding filter coefficient as a function of the radius. The shape of the footprint is determined as a trade-off between image quality and processing speed. In one implementation, profiles of smoothing and warping components are combined to produce sharper or detail enhanced output image. The method and system of the invention produce natural output image without jagging artifacts, while maintaining or enhancing the sharpness of the input image.

14 Claims, 4 Drawing Sheets

U.S. PATENT DOCUMENTS

| | | |
|---|---|---|
| 6,016,152 A | 1/2000 | Dickie |
| 6,061,477 A | 5/2000 | Lohmeyer et al. |
| 6,292,193 B1 | 9/2001 | Perry et al. |
| 2004/0012603 A1* | 1/2004 | Pfister et al. ............... 345/582 |
| 2004/0113921 A1* | 6/2004 | Hains et al. ................ 345/611 |

OTHER PUBLICATIONS

Zwicker, M. et al., "EWA Splatting," IEEE Transactions on Visualization and Computer Graphics, vol. 8, No. 3, Jul. to Sep., 2002, pp. 223-239.

Chen, B. et al., "Footprint Area Sampled Texturing," IEEE Transaction on Visualization and Computer Graphics, vol. 10, No. 2, Mar. to Apr. 2004, pp. 230-240.

The following three notices (1)-(3) are PCT notices in the corresponding PCT Application No. PCT/US04/29393.

(1) Notification of Transmittal of the International Search Report and the Written Opinion of the International Searching Authority, or the Declaration.

(2) International Search Report.

(3) Written Opinion of the International Searching Authority.

* cited by examiner

SINGLE-PASS IMAGE RESAMPLING SYSTEM AND METHOD WITH ANISOTROPIC FILTERING

FIELD OF THE INVENTION

This invention relates to filtering methods in digital image transformation, and in particular, anisotropic filtering in signal resampling in single-pass digital image warping systems.

BACKGROUND OF THE INVENTION

A digital image is basically a two-dimensional array of digital data with each entry representing a pixel of the digitized image. Pixel data contain intensity components like red, green, and blue (RGB). Display systems electronically assign intensity values to these different components based on input digital data. The displayed images, however, may have various optical and geometric distortions, such as lens distortions such as pincushion and barrel distortions, projection keystone distortions, and so on. One way to compensate for these distortions is digital image warping, or "non-uniform scaling". Image warping may be defined as a process of dynamically resampling a regularly spaced input image to produce an output image with different spacing than the input image. Image warping is widely used in linear scaling operations like zoom and shrink, which are particular and simpler cases.

There are two basic stages in an image warping system: spatial transformation, and resampling.

A spatial transformation is defined as a mapping function between pixel coordinates in the input and output images. Inverse mapping, which specifies coordinates in the input image as a function of the coordinates in the output image, is usually used to cover the entire output image coordinate space and to avoid leaving "holes".

Resampling, on the other hand, is the process of using several input pixels surrounding an input pixel to interpolate the output image pixels. The neighborhood containing these input pixels, which participate in the interpolation, is called filter footprint. It is well known in the art that the larger the filter footprint, the better the output image quality. In addition, anisotropic footprints are known to yield better output image quality. There is a trade off between the size and anisotropy of the footprint and the efficiency of the hardware implementation. Resampling is accomplished by dynamically band limiting the spatial frequency of the warped image to the Nyquist limit in all directions around the processed output pixel.

In order to reduce hardware resources required for filtering, image warping can be conducted in two separate horizontal and vertical passes. In this case the transformation must be separable (i.e., capable of being decomposed), into a sequence of two orthogonal, one-dimensional transformations. Examples of two-pass warping are used in U.S. Pat. Nos. 5,175,808, 5,594,676, and 6,061,477. The two-pass approach has many drawbacks however. Firstly, not all geometrical transformations are separable (bottleneck and fold over problems). Secondly, the separation itself may introduce geometrical distortions. Thirdly, two-pass filtering is prone to producing jagging artifacts, especially when the geometrical transformation has rotational component. Therefore, it is desirable to design a single-pass method for 2D image transformation (warping) that is free from disadvantages of the two-pass algorithm.

In multi-rate signal processing, in order to avoid unwanted artifacts, the resampling process of a digital image includes the following steps: reconstructing the continuous signal from its discrete samples, warping the continuous signal, low pass filtering the continuous signal to eliminate aliased frequencies above the normalized Nyquist frequency in the target image, and sampling the continuous warped signal at the output pixel grid sampling locations.

It is known in the art that these steps of the ideal resampling procedure may be concatenated into a single unified elliptical Gaussian filter called Elliptical Weighted Averaging [Paul S. Heckbert, "Fundamentals of Texture Mapping and Image Warping", master Thesis, UCB, 1989]. Since then many efforts have been made to reduce needed hardware in terms of memory and clocks by using approximations of the ellipse radii.

U.S. Pat. No. 6,016,152, to Dickie, discloses apparatus and method for non-uniform image scaling approximated by corresponding affine transformation, which is used to define an ellipse in the source image. A linear transformation from a unit circle in the source image to the ellipse in the source image is calculated. A pixel value in the destination image is determined by identifying pixels included in the source image in order to reduce artifacts in non-uniform scaling applications.

U.S. Pat. No. 6,005,582, to Gabriel et. al., discloses method and system for texture mapping images with anisotropic filtering that includes passing an interpolating filter along a line of anisotropy in a texture map and computing a weighted sum of the outputs of the interpolating filter to compute pixel intensity values. The weighting of these output values can be computed using a one-dimensional digital filter. The line of anisotropy is derived from the inverse transform, which describes the mapping of a point on the surface of a geometric primitive to a point in the texture map.

U.S. Pat. No. 6,292,193, to Perry et. al., discloses techniques for anisotropic texture mapping using multiple space-invariant filtering operations per pixel. A circular pixel filter is projected onto a texture map to define an elliptical footprint in that texture map. Sample points are determined on a line in the footprint that closely approximates the major axis of the ellipse. These sample points are mapped to levels of detail and locations within mip-map. Using a space invariant filter, a texture value is computed for each sample point using data from one or more texture maps within mi-map. These texture values for the sample points are post-filtered using a Gaussian filter function and summed to produce a final texture value.

European Patent No. EP0920671B1, to Lohmeyer et. al., discloses method for computationally efficient single pass digital image warping that consists of the following stages: increasing the sampling rate of an input image above Nyquist rate, warping the upsampled image using a low quality interpolator such as a bilinear interpolator, and downsampling the warped image to the same resolution as the input image. Downsampling and warping stages can be combined into one step by modifying the geometric transformation function when warping the upsampled image.

However, these and other prior art systems provide a modest trade-off between aliasing and sharpness because their impulse responses produce pure frequency responses. Therefore, there is a need for an improved interpolation method and apparatus to support more flexible filtering in digital image warping system.

SUMMARY OF THE INVENTION

The present invention in one aspect provides a digital signal processing method for optimized hardware and software implementation of real-time single-pass digital image resampling with an anisotropic filter to transform a two-dimensional input image having an input pixel coordinate space and input digital pixel data, into an output image having an output pixel coordinate space and output digital pixel data, said method comprising:
  (a) obtaining two-dimensional input digital image data for an output pixel;
  (b) mapping the output pixel coordinates onto the input image coordinate space to determine a mapped coordinate position;
  (c) determining the Jacobian matrix of the output pixel coordinates with respect to the input coordinates at the mapped coordinate position determined in (b);
  (d) determining major and minor radii and the orientation of the major radius to uniquely determine an ellipse around the mapped coordinate position determined in (b), formed by two row vectors of the determined Jacobian matrix in (c);
  (e) extending and adjusting the radii of said ellipse based on a required image quality and a required processing speed;
  (f) determining a footprint based on the result of (e) in the input image coordinate space around said mapped coordinate position determined in (b), to include input pixels participating in the filtering;
  (g) transforming the ellipse of (d) into a circle having a radius of one unit to facilitate distance calculation of the included input pixels from the center of the circle;
  (h) determining coefficients of the anisotropic filter for all input pixels in the footprint from a circularly symmetric profile as a function of the distance in (g);
  (i) determining the value of the output pixel by accumulating values of the input pixels inside the footprint with coefficients determined in (h); and
  (j) saving the value of the output pixel.

The invention in another aspect provides a digital signal processing system for optimized hardware and software implementation of real-time single-pass digital image resampling with an anisotropic filter to transform a two-dimensional input image having an input pixel coordinate space and input digital pixel data, into an output image having an output pixel coordinate space and output digital pixel data, said system comprising the following stages:
  (a) an input interface for obtaining two-dimensional input digital image data for an output pixel;
  (b) a coordinates generator for mapping the output pixel coordinates onto the input image coordinate space to determine a mapped coordinate position;
  (c) a local scale estimator, coupled to said input interface and said coordinate generator, for determining the Jacobian matrix of the output pixel coordinates with respect to the input coordinates at the mapped coordinate position;
  (d) said local scale estimator, being further adapted for determining the major and minor radii and the orientation of the major radius to uniquely determine an ellipse around the mapped coordinate position, formed by two row vectors of the determined Jacobian matrix in (c);
  (e) said local scale estimator, being further adapted to extend and adjust the radii of said ellipse based on a required image quality and a required processing speed;
  (f) a footprint generator, coupled to said local scale estimator and said coordinates generator, for determining a footprint in the input image coordinate space around the mapped coordinate position, to include input pixels participating in the filtering;
  (g) a filter coefficients generator, coupled to said footprint generator and said local scale estimator, to transform the ellipse of (d) into a circle having a radius of one unit to facilitate distance calculation of the included input pixels from the center of the circle;
  (h) said filter coefficient generator, being further adapted to determine coefficients of the anisotropic filter for input pixels in the footprint from a circularly symmetric profile as a function of the distance in (g);
  (i) a filter, coupled to said filter coefficient generator and said footprint generator, to determine the value of the output pixel by accumulating values of the input pixels inside the footprint with coefficients determined in (h); and
  (j) an output interface, coupled to said filter, to save the value of the output pixel.

One example implementation of the present invention provides a method for generating a circularly symmetric profile of an anisotropic filter to produce sharpness and detail enhancement in an image.

In one example of the present invention, the filter's footprint has an elliptical shape extended by some factor, which establishes trade-off between image quality and processing speed.

In another example of the present invention, the filter's footprint has a fixed rectangular shape in order to minimize the complexity and bandwidth of a caching subsystem in the image warping system.

In yet another example of the present invention, the shape of the obtained ellipse is adjusted in accordance with local edge orientation.

Further details of different aspects and advantages of the embodiments of the invention will be revealed in the following description along with the accompanying drawings.

DETAILED DESCRIPTION OF THE INVENTION

Figure 1:
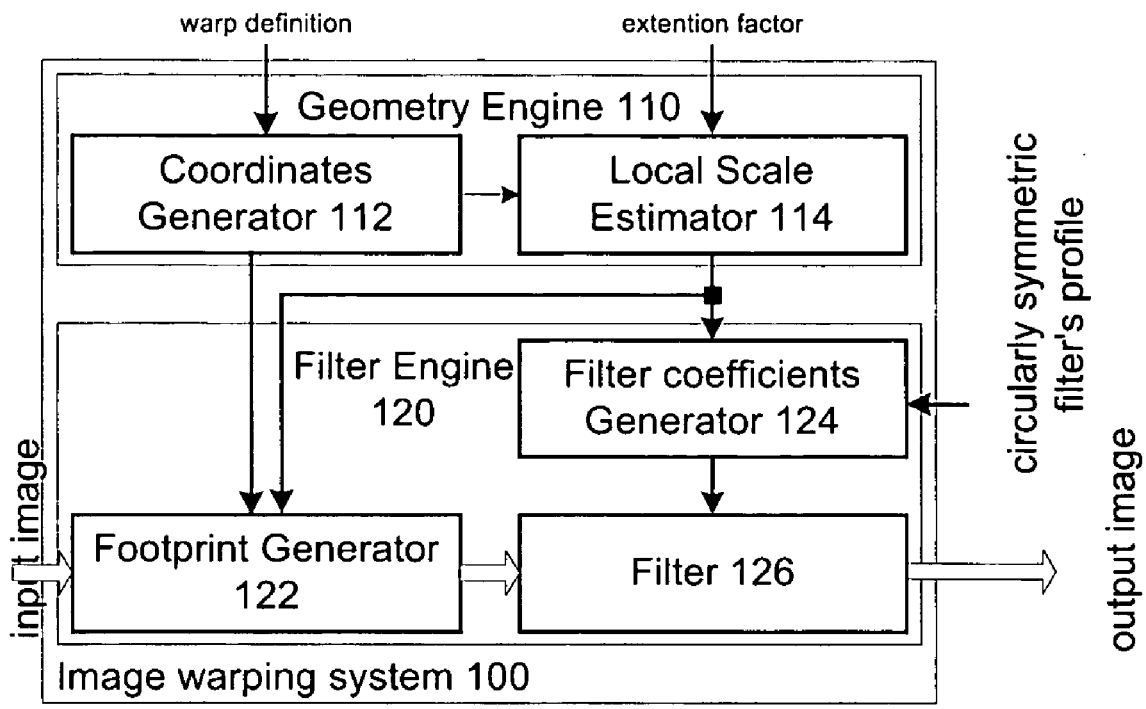
FIG. 1 is a block diagram illustrating a preferred embodiment of the image warping system built in accordance with the present invention.

Reference is first made to FIG. 1 which shows an image warping system 100 made in accordance with a preferred embodiment of the invention. Image warping system 100 is a single-pass digital image warping system with circularly symmetric anisotropic filtering. Image warping system 100 includes a coordinates generator 112, a local scale estimator 114, a footprint generator 122, a filter coefficients generator 124, and a filter 126. The coordinates generator 112 transforms pixel coordinates from an output image space onto an input image space. Local scale estimator 114, calculates parameters of a linear transformation to a unit circle from an ellipse that approximates non-uniform image scaling function in the mapped output pixel. Footprint generator 122 determines input pixels to be participated in the filtering. Filter coefficients generator 124 calculates weights of the input pixels in the footprint using circularly symmetric profile. Finally, filter 126 calculates the output pixel.

Image warping system 100 includes two major units: a geometry engine 110 and a filter engine 120. The function of geometry engine 110 relates to geometric transformations.

Geometry engine 110 includes coordinates generator 112 and local scale estimator 114. Coordinates generator 112 maps the coordinates of an output pixel onto the input image coordinate space. This transformation could range from a straightforward scaling to a complicated warping. Mapping output coordinates onto input coordinates, or the so-called inverse transformation, has many advantages known to people skilled in the art, including covering the entire output pixel space and not leaving "holes" in the output image.

Another element of geometry engine 110 is local scale estimator 114, which is crucial to the operation of filter engine 120 in calculating filter coefficients, as will be explained in more detail.

Figure 2:
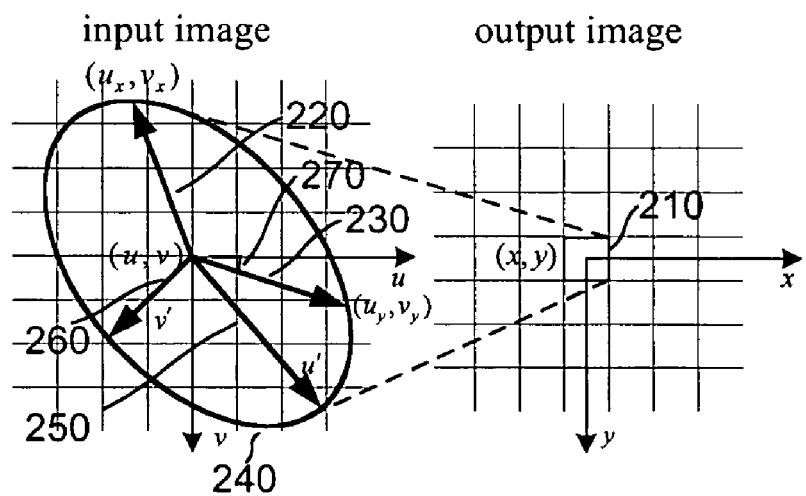
FIG. 2 is a graphical representation of an example of mapping an output pixel from output image space into an ellipse in the input image space.

Local scale estimator 114 calculates elements of a 2×2 matrix that determines a linear transformation from an ellipse to a circle of radius one. This transformation approximates a non-uniform image scaling function in the position of the mapped output pixel and it is calculated based on the Jacobian matrix, which is a matrix containing first-order partial derivatives of a vector function in its rows. As illustrated in FIG. 2, the Jacobian matrix is a local affine approximation of the local mapping function at the position of the mapped output pixel 210:

$$J(x, y) = \begin{bmatrix} u_x & v_x \\ u_y & v_y \end{bmatrix} = \begin{bmatrix} \frac{\partial u}{\partial x}(x, y) & \frac{\partial v}{\partial x}(x, y) \\ \frac{\partial u}{\partial y}(x, y) & \frac{\partial v}{\partial y}(x, y) \end{bmatrix}.$$

The rows of the Jacobian matrix form two vectors 220 and 230 that determine the ellipse 240 with major radius 250, minor radius 260, and angle 270 between major radius and horizontal direction.

The ellipse 240 is characterized with a 2×2 transformation matrix based on the Jacobian matrix. Since three parameters are enough to describe an arbitrarily oriented ellipse (for example, two orthogonal radii and the orientation angle of the major radius define the ellipse), this matrix may be calculated in such a way that only three of its elements are non-zero and the fourth element is always zero.

In one example of the invention, local scale estimator 114 computes elements of the matrix M to implement the following linear transformation:

$$\begin{bmatrix} u' \\ v' \end{bmatrix} = \begin{bmatrix} M_{00} & M_{01} \\ M_{10} & M_{11} \end{bmatrix} \begin{bmatrix} u \\ v \end{bmatrix},$$

where (u,v) are source pixel coordinates relative to the center of the ellipse, and (u',v') are "ellipse space" coordinates. In the ellipse space, coordinates of the pixels inside the ellipse satisfy the equation:

$$r^2(u',v')=(u')^2+(v')^2 \leq 1.$$

Accordingly, matrix M maps the ellipse onto a circle of radius one. To generate this matrix, first the ellipse's major radius $\lambda_1$, minor radius $\lambda_2$ and angle $\alpha_1$ of the major radius with the horizontal direction are found from the Jacobian matrix. Then, any required radii limitations are applied. Finally, three non-zero elements of M are calculated from these three parameters.

Local scale estimator 114 uses the rows of the Jacobian matrix J to solve the following equation:

$$Q=J^{-1}(J^{-1})^T.$$

Solving the above equation for J, under the constraint that the basis is orthogonal, i.e.:

$$J = \begin{bmatrix} \lambda_1 & 0 \\ 0 & \lambda_2 \end{bmatrix} \begin{bmatrix} \cos\alpha_1 & \sin\alpha_1 \\ -\sin\alpha_1 & \cos\alpha_1 \end{bmatrix},$$

eigenvectors of the Jacobian can be computed. In one example of the invention, this is done by first calculating the following intermediate variables from the elements of the Jacobian matrix:

$$A=v_x^2+v_y^2,\ B=-2(u_xv_x+u_yv_y),\ C=u_x^2+u_y^2,\ F=(u_xv_y-u_yv_x)^2,\ P=A-C,\ Q=A+C,\ T=\text{sign}(P)\sqrt{P^2+B^2}.$$

Then the lengths of the orthogonal radii of the ellipse, which are the required eigenvalues, are represented by the values:

$$\lambda_1 = \max\left(\sqrt{\frac{2F}{Q+T}}, \sqrt{\frac{2F}{Q-T}}\right),\ \lambda_2 = \min\left(\sqrt{\frac{2F}{Q+T}}, \sqrt{\frac{2F}{Q-T}}\right).$$

Finally, the angle of the major radius with respect to the horizontal direction is calculated as follows:

$$\tan\alpha_1 = \text{sign}(B)\text{sign}(P) \begin{cases} \sqrt{\frac{T-P}{T+P}}, & \lambda_1 = \sqrt{\frac{2F}{Q+T}}, \\ -\sqrt{\frac{T+P}{T-P}}, & \text{otherwise} \end{cases}$$

or:

$$\sin 2\alpha_1 = -\frac{P}{T}\ \text{and}\ \cos 2\alpha_1 = -\frac{B}{T}.$$

or:

In a particular example of the invention, the obtained ellipse may be extended by some factor to provide better flexibility in terms of image quality and processing speed. For example, if the input and output images are small enough, one can increase the footprint by some factor (i.e. perform filtering over a greater area). This will improve image quality because of better frequency response of the two-dimensional filter. On the other hand, the footprint may be reduced down to a minimal size in the case of large input and output images or big local shrink scales.

In addition, in order to restrict the number of processed pixels in a case of local shrink as a result of the warp map, two limits are imposed on $\lambda_1$ and $\lambda_2$. The first limit $\lambda_{max}$ bounds maximum length of the ellipse radii and the second $\beta_{max}$ limits the anisotropy ratio, i.e. a ratio of the major to minor radii. Moreover, if either of $\lambda_1, \lambda_2$ is less than a predetermined minimum, it is replaced by the third limit $\lambda_{min}$, which obviously should not be smaller than one. This last limit ensures that the filter footprint is never too small to perform interpolation. This limiting process may be expressed by the following equations:

$$\lambda_1 \leftarrow \text{cut}(\lambda_{min}, \lambda_1, \lambda_{max}), \lambda_2 \leftarrow \text{cut}(\lambda_{min}, \lambda_2, \lambda_{max}),$$
$$\lambda_1 \leftarrow \min(\lambda_1, \lambda_2 \beta_{max}).$$

In one example of the invention, if, after imposing the limits, both radii are equal to one, which means that there is a local expansion in all directions, the ellipse's radii are adjusted according to the orientation of the local edge. The minor radius is kept as one and the major radius is extended proportionally to the strength of the edge.

The calculation of the matrix M is contrived so that $M_{10}$ is zero. This is done by concatenating onto the matrix M a suitable rotation in (u',v') space, which does not affect the radius. The mapping to the "ellipse space" (u',v') by means of M can be expressed as:

$$M = \begin{bmatrix} \cos\theta & \sin\theta \\ -\sin\theta & \cos\theta \end{bmatrix} \begin{bmatrix} \frac{\cos\alpha_1}{\lambda_1 R_u} & \frac{\sin\alpha_1}{\lambda_1 R_u} \\ -\frac{\sin\alpha_1}{\lambda_2 R_u} & \frac{\cos\alpha_1}{\lambda_2 R_u} \end{bmatrix},$$

where $R_u$ is the extension factor. The right-hand matrix rotates the coordinate space by the angle of the ellipse's major axis, then scales it non-uniformly in the axes directions so that the ellipse itself maps onto the unit circle. The left-hand matrix provides an additional rotation by $\theta$. Since the left-hand rotation has no effect on filter's coefficient calculations, we can choose it arbitrarily to force $M_{10}$ to zero, i.e.:

$$\tan\theta = \frac{\lambda_1 \sin\alpha}{\lambda_2 \cos\alpha} \text{ or } \sin\theta = \frac{\lambda_1 \sin\alpha_1}{R}, \cos\theta = \frac{\lambda_2 \cos\alpha_1}{R}, \text{ where}$$

$$R = \sqrt{\lambda_2^2 \cos^2\alpha_1 + \lambda_1^2 \sin^2\alpha_1}.$$

Figure 3:
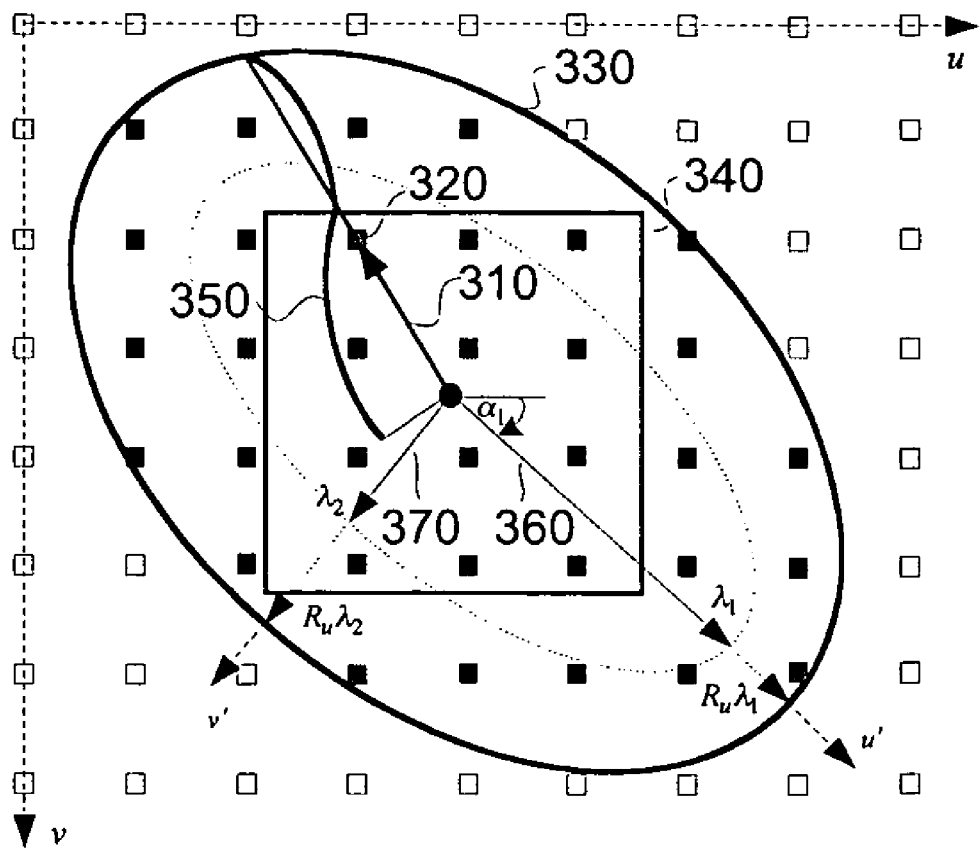
FIG. 3 is a graphical representation of anelliptical filter with deployed circularly symmetric profile over elliptical or rectangular footprint.

Substituting these values and replacing $\beta = \lambda_1/\lambda_2$ we finally obtain As shown in FIG. 3, a radius 310 of the input pixel 320, inside the elliptical footprint 330 or rectangular footprint 340, is considered as an index into a look-up table with profile (impulse response) 350 of a circularly symmetric filter. The profile of the circularly symmetric filter is stretched or shrunken in accordance with a distance from a center of the ellipse to its edge in a direction of input processed pixel. In this figure, $\lambda_1$ is a major radius 360, $\lambda_2$ is a minor radius 370 and $R_u$ is the ellipse extension factor. If $\lambda_1 = \lambda_2 = 1$, then the filter performs upsampling in all directions. If $\lambda_1 > 1, \lambda_2 > 1$, then the filter performs downsampling in all directions. But, if $\lambda_1 > 1, \lambda_2 = 1$, then there is a mixture of upsampling and downsampling with a smooth transition between expansion and shrinking.

Figure 4A:
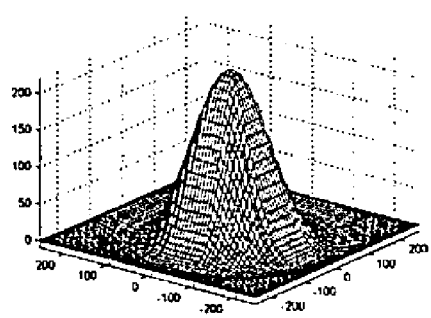
FIG. 4A is a graphical representation of the two-dimensional impulse response of the anisotropic filter with circularly symmetric profile.
Figure 4B:
FIG. 4B is a graphical representation of the two-dimensional frequency response of the anisotropic filter with circularly symmetric profile.

In a case of fixed extension factor $R_u$ and fixed number of coefficients N in the impulse response, the circularly symmetric profile has variable length and variable fractional bandwidth that depend on the ellipse orientation and shape. Two-dimensional impulse and frequency responses of the filter for the particular case of $R_u = 2$ and $N = 256$ are shown in FIG. 4A and FIG. 4B respectively.

In case of anisotropic elliptical filtering, filter engine 120 needs at least five parameters to generate warped image: two coordinates u,v to map output pixel coordinates to the input image coordinate space and three parameters $M_{00}, M_{01}, M_{11}$ to represent a linear transformation from an ellipse to a unit circle.

Since for some spatial transformations the first two maps may be very complicated or even may not have analytical form, in one particular example of the invention, these maps are approximated by surfaces fitted with polynomials:

$$u(x, y) = \sum_{i=0}^{I} \sum_{j=0}^{J} a_{ij} x^i y^j, \; v(x, y) = \sum_{i=0}^{I} \sum_{j=0}^{J} b_{ij} x^i y^j,$$

where $a_{ij}, b_{ij}$ are polynomial coefficients, and I,J are degrees of the polynomials. This representation is abstracted from a physical model of the spatial transformation and, as a benefit, has a compact representation of the mapping functions.

In one example of the invention, the elements of the matrix M, which represent a linear transformation from an ellipse to a unit circle, are calculated directly from the coordinate polynomials in real time. They are calculated from the Jacobian matrix, the four elements of which are partial derivatives of the two coordinate polynomials.

In another example of the invention, the elements of the matrix M are represented by polynomial fitted surfaces, in order to save in computation time, as follows:

$$M = \frac{1}{R_u \sqrt{\lambda_1 \lambda_2}} \frac{1}{\sqrt{\frac{\beta^2+1}{2\beta} - \frac{\beta^2-1}{2\beta}\cos 2\alpha_1}} \begin{bmatrix} \frac{\beta^2+1}{2\beta} - \frac{\beta^2-1}{2\beta}\cos 2\alpha_1 & -\frac{\beta^2-1}{2\beta}\sin 2\alpha_1 \\ 0 & 1 \end{bmatrix}.$$

$$M_{00}(x, y) = \sum_{i=0}^{I} \sum_{j=0}^{J} c_{ij} x^i y^j, \quad M_{01}(x, y) = \sum_{i=0}^{I} \sum_{j=0}^{J} d_{ij} x^i y^j,$$

$$M_{11}(x, y) = \sum_{i=0}^{I} \sum_{j=0}^{J} e_{ij} x^i y^j,$$

where $c_{ij}, d_{ij}, e_{ij}$ are polynomial coefficients, and I,J are orders of the polynomials.

Footprint generator 122 defines an area around the mapped position of the output pixel in the input image coordinate space to include input pixels for generating the output pixel data. In one example of the invention, the footprint has an elliptical shape based on computed elements of the matrix M. This example provides better image quality but demands more hardware resources. In another example of the invention, the footprint has a rectangular shape in order to minimize the complexity of a pixel inclusion while compromising on output image quality.

Filter coefficients generator 124 evaluates weights of the input pixels included in the footprint. In one example of the invention, the weight of an input pixel is a function of its distance from the center of the ellipse mapped onto a circle of radius one. In one particular implementation of this example, these weights are calculated dynamically for higher flexibility at the expense of hardware resources. In another implementation, in order to save on hardware resources, the weights are taken from a look-up table with pre-calculated circularly symmetric profile.

To understand the method of generating the profiles, it is necessary to mention that there are four standard approaches to design a two-dimensional finite impulse response (FIR) filter: the window method, the frequency sampling method, the frequency transformation method, and the optimal filter design. The window method, which is a straightforward extension of a one-dimensional filter design, has been chosen, in one example of the invention, for the design of circularly symmetric filter profile.

If the frequency response $H(\omega_u, \omega_v)$ is known, one can determine the impulse response of the filter $h(u',v')$ by inverse Fourier transformation. The required finite impulse response (FIR) filter is obtained by truncating the impulse response $h(u',v')$ and multiplying it by a window function $w(u',v')$, so that $h_d(u',v') = h(u',v') w(u',v')$.

A desirable frequency response for image warping is a circularly symmetrical ideal lowpass filter $$H(\omega_u, \omega_v) = \begin{cases} 1, & \omega_u^2 + \omega_v^2 \leq \omega_c^2 \\ 0, & \text{otherwise} \end{cases}, \text{ where} -\pi \leq \omega_u, \omega_v \leq \pi.$$

An impulse response of such a filter with cutoff frequency of $\omega_c$ is given by $$h(u', v') = \frac{\omega_c}{2\pi r(u', v')} J_1(\omega_c r(u', v')),$$

where $$r(u', v') = \frac{R_u \sqrt{(u')^2 + (v')^2}}{N} = \frac{R_u n}{N}$$

is the normalized radius, n satisfies $0 \leq n < N$, $J_1$ is the Bessel function of the first kind and first order. The two-dimensional window $w(u',v')$ is based upon a one-dimensional Kaiser window prototype. With the rotated formulation the actual region of support for the design will be a circular subregion of $R_u$.

$$w(u', v') = \begin{cases} \dfrac{I_0\left(\beta\sqrt{1 - r^2(u', v')/R_u^2}\right)}{I_0 \beta}, & r(u', v') \leq R_u \\ 0, & \text{otherwise} \end{cases},$$

where $I_0( )$ is the modified Bessel function of the first kind, order zero, $\beta$ is a parameter.

Visual appearance of the output warped image may be significantly improved by emphasizing its high frequency contents to enhance the edges and details therein. Filter coefficients generator 124, in one example of the invention, uses the classic linear unsharp masking algorithm for this purpose. In this technique a fraction of the high-pass filtered image is added to the image itself. In one modification of the linear unsharp masking algorithm, when low-passed filtered (smoothed) signal over pixel's neighborhood is subtracted from the pixel's value, the enhanced image $O(x,y)$ is obtained from the input image $I(x,y)$ as follows:

$$O(x,y) = I(x,y) + \alpha(I(x,y) - I_s(x,y)) = (1+\alpha)I(x,y) - \alpha I_s(x,y),$$

where $I(x,y)$ and $O(x,y)$ are input and output pixel values, $I_s(x,y)$ is a smoothed pixel value over some neighborhood, and $\alpha$ is a factor of enhancement. Here, a $\alpha<0$ implies smoothing, $\alpha=0$ implies bypass, and $\alpha>0$ implies sharpening.

In a case of digital image warping, this formula is transforming to the following $$O(x,y) = (1+\alpha)I_w(x,y) - \alpha I_s(x,y),$$

where $I_w(x,y)$ is a warped pixel value and $I_s(x,y)$ is a smoothed pixel value in the output space. The footprint for calculating the warped and smoothed pixel values is the same. In order to save on hardware resources the two operations are combined in one circularly symmetric profile, which assumes both filtering terms. These terms take the form:

$$O(x, y) = (1+\alpha) \frac{\sum_{n=0}^{N(x,y)} k_n^w I(u_n, v_n)}{\sum_{n=0}^{N(x,y)} k_n^w} - \alpha \frac{\sum_{n=0}^{N(x,y)} k_n^s I(u_n, v_n)}{\sum_{n=0}^{N(x,y)} k_n^s}$$

$$= \frac{\sum_{n=0}^{N(x,y)} \left((1+\alpha)k_n^w - \alpha \frac{\sum_{n=0}^{N(x,y)} k_n^w}{\sum_{n=0}^{N(x,y)} k_n^s} k_n^s\right) I(u_n, v_n)}{\sum_{n=0}^{N(x,y)} k_n^w}.$$

where $k_n^w$ are warping filter's coefficients, $k_n^s$ are smoothing filter's coefficients, and index n counts input pixels $(u_n, v_n)$ belonging to the footprint. The number of input pixels $N(x,y)$ in the footprint is a function of output pixel coordinates. So, we have a new set of coefficients $$k_n = (1+\alpha)k_n^w - \alpha \frac{\sum_{n=0}^{N(x,y)} k_n^w}{\sum_{n=0}^{N(x,y)} k_n^s} k_n^s$$

that assume both smoothing and warping components in the filter for detail enhancement of the output image, where $$\sum_{n=0}^{N(x,y)} k_n = \sum_{n=0}^{N(x,y)} k_n^w.$$

As seen from the last equation, this approach for detail enhancement can be applied if a ratio of coefficient sums over the same footprint is a constant for all output pixels of the warp, i.e.

$$T(x,y) = \frac{T^w(x,y)}{T^s(x,y)} = \frac{\sum_{n=0}^{N(x,y)} k_n^w}{\sum_{n=0}^{N(x,y)} k_n^s} = T.$$

For an elliptical footprint, the constant T may be estimated by the following equation:

$$T \approx \frac{\sum_{i=0}^{N^w-1} s_i k_i^w}{\sum_{i=0}^{N^s-1} s_i k_i^s},$$

where i counts filter's taps, $s_i$ is an area of an elliptical ring occupied by i-th coefficient, $N^w$ is the number of taps in warping part of the filter and $N^s$ is the number of taps in smoothing part of the filter.

If $\lambda_1, \lambda_2$ are major and minor radii of the elliptical footprint, then $$s_i = \pi \frac{\lambda_1(i+1)R_u}{N} \frac{\lambda_2(i+1)R_u}{N} - \pi \frac{\lambda_1 i R_u}{N} \frac{\lambda_2 i R_u}{N}$$
$$= \frac{\pi \lambda_1 \lambda_2 R_u^2}{N^2}((i+1)^2 - i^2)$$
$$= \frac{\pi \lambda_1 \lambda_2 R_u^2}{N^2}((2i+1))$$

and $$R_u = \max(R_u^w, R_u^s), N^w = \frac{NR_u^w}{R_u}, N^s = \frac{NR_u^s}{R_u},$$

where N is the maximum number of the filter taps.

After substituting we finally get:

$$T = \frac{T^w}{T^s} = \frac{\sum_{i=0}^{N^w-1} \pi \frac{\lambda_1 \lambda_2 R_u^2}{N^2}(2i+1)k_i^w}{\sum_{i=0}^{N^s-1} \pi \frac{\lambda_1 \lambda_2 R_u^2}{N^2}(2i+1)k_i^s} = \frac{\sum_{i=0}^{N-1}(2i+1)k_i^w}{\sum_{i=0}^{N-1}(2i+1)k_i^s}.$$

If $N^w > N^s$, then $k_i^s = 0$ for $N^s \leq i < N^w$, and if $N^s > N^w$ then $k_i^w = 0$ for $N^w \leq i < N^s$.

As we can see from the last equation, for an elliptical footprint the ratio T depends only on corresponding coefficients of warping and smoothing filters. This means that filter design of the present invention, in this particular implementation, is appropriate for image detail enhancement.

If the circularly symmetric profile is a function of the squared radius instead of the radius itself, then the formula for the calculation of the constant T is reduced to the following:

$$T = \frac{\sum_{i=0}^{N-1} k_i^w}{\sum_{i=0}^{N-1} k_i^s}.$$

Once the weights of the input pixels are calculated, filter 126 generates the output pixel by accumulating the input pixel intensities in the footprint. Image warping system 100 then moves on to process the next output pixel until the whole output image is generated.

Figure 5A:
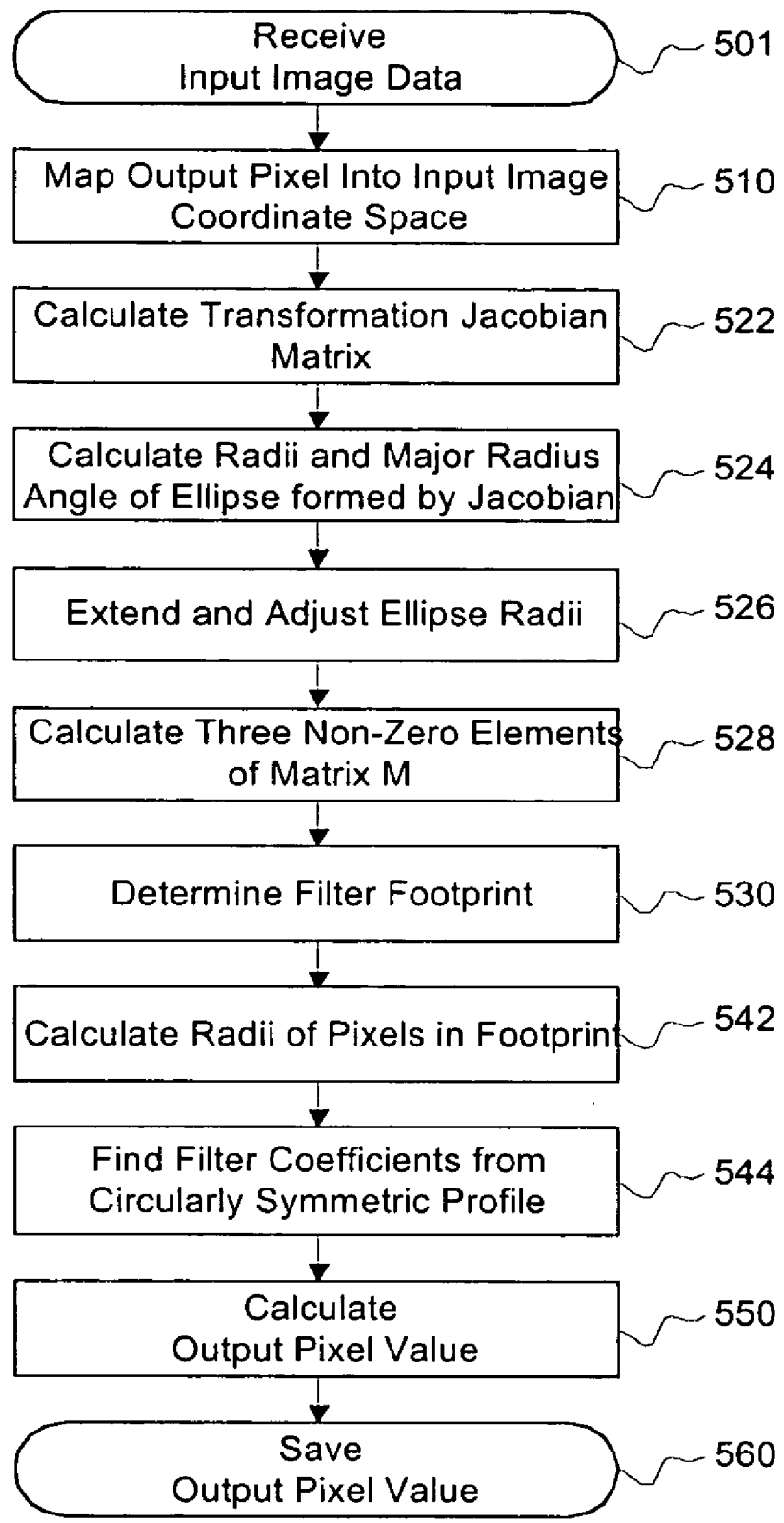
FIG. 5A is a graphical representation of the flow logic executed by the image warping system of FIG. 1.

FIG. 5A represents the logic flow of an example of image warping system 100 built according to the present invention. At step 501 the system receives digital data corresponding to an input image. At step 510, the coordinates of an output pixel are mapped onto input image space. Then, at step 522, the Jacobian matrix that approximates a non-uniform image scaling function in the mapped output pixel position is estimated. At step 524, major and minor radii and angle of the major radius of an ellipse formed by row vectors of the Jacobian matrix are calculated. At step 526, the radii of the ellipse are adjusted in accordance with required output image quality and processing speed. At step 528, the three parameters of the ellipse are used in calculating three non-zero elements of matrix M, which represents a linear transformation from the ellipse to a circle with radius one. At step 530, a footprint containing input image pixels is determined around the mapped coordinates of step 510. The size and shape of this footprint depend on the chosen topology of the filtering and it is a trade-off between desired quality of the output image and computational power. At step 542 for each input pixel in the footprint, a distance between center of the ellipse and the input pixel position is calculated. Filtering coefficients for the inputs pixel from the footprint are calculated from a circularly symmetric profile at step 544 as a function of the calculated distances at the previous step. Finally, at step 550, input pixels from the footprint are accumulated with weights determined at step 544, and the generated output pixel is saved in output image at step 560.

Figure 5B:
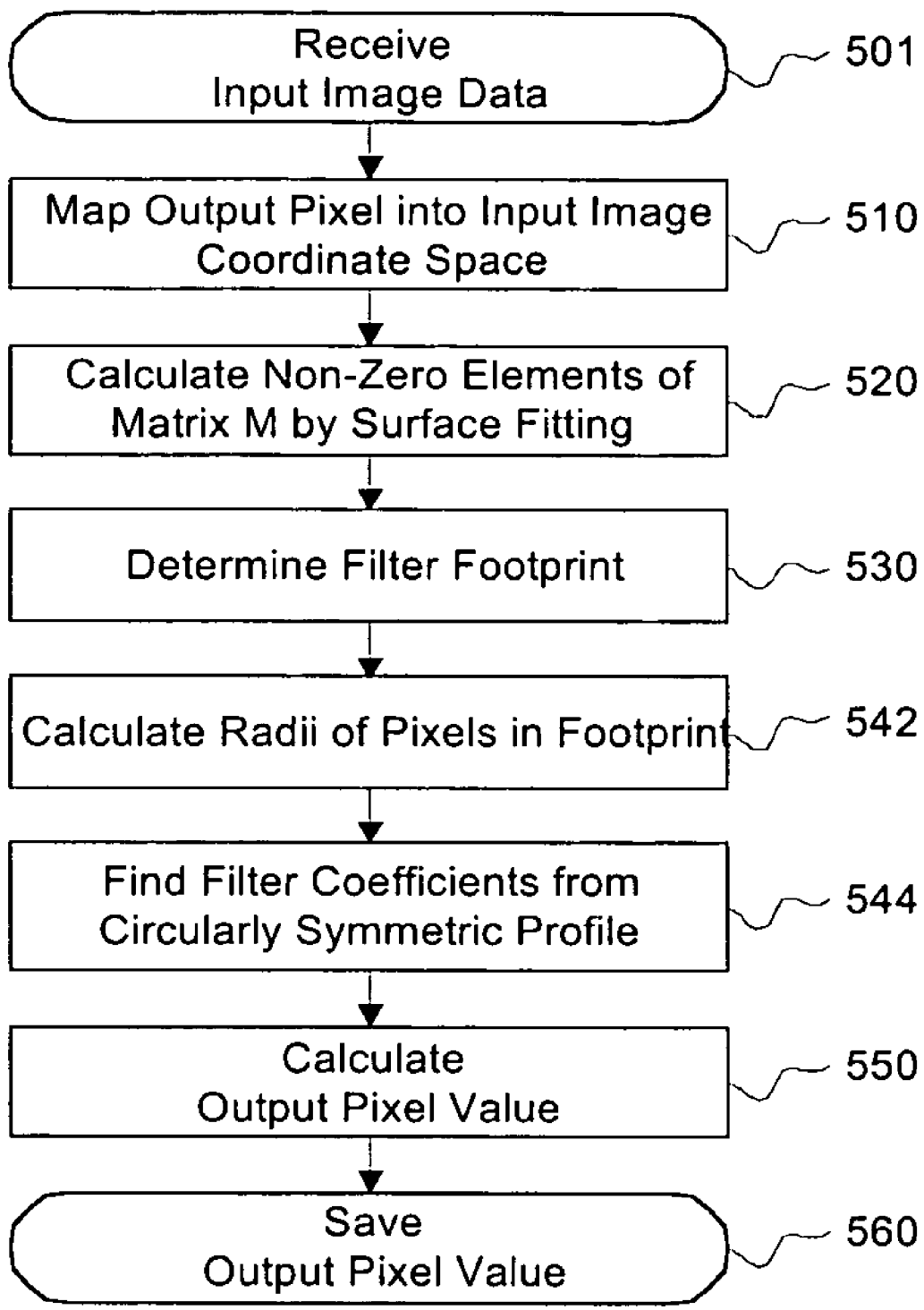
FIG. 5B is a graphical representation of the flow logic of an example of a system build in accordance with the present invention and using surface fitting to generate three invented parameters of a linear transformation from an ellipse to unit circle.

FIG. 5B shows a specific implementation of the flow diagram of FIG. 5A where the three non-zero elements of matrix M are calculated from polynomial fitted surfaces. In this example of the invention, three non-zero elements of the matrix M are calculated for a set of grid points and polynomial fitted with generating fitting coefficients. During digital image warping in each processed output pixel, the matrix elements of M are estimated from the fitting coefficients.

As will be apparent to those skilled in the art, various modifications and adaptations of the structure described above are possible without departing from the present invention, the scope of which is defined in the appended claims

The invention claimed is:

1. A digital signal processing method for optimized hardware and software implementation of single-pass digital image resampling with an anisotropic filter to transform a two-dimensional video input image having an input pixel coordinate space and input digital pixel data, into an output image having an output pixel coordinate space and output digital pixel data, said method comprising:
   (a) obtaining two-dimensional video input digital image data for an output pixel;
   (b) mapping the output pixel coordinates onto the input image coordinate space to determine a mapped coordinate position;
   (c) determining the Jacobian matrix of the output pixel coordinates with respect to the input coordinates at the mapped coordinate position determined in (b);
   (d) determining major and minor radii and the orientation of the major radius to uniquely determine an ellipse around the mapped coordinate position determined in (b), formed by two row vectors of the determined Jacobian matrix in (c);
   (e) extending and adjusting the radii of said ellipse based on a required image quality and a required processing speed;
   (f) determining a footprint based on the result of (e) in the input image coordinate space around said mapped coordinate position determined in (b), to include input pixels participating in the filtering;
   (g) transforming the ellipse of (d) into a circle having a radius of one unit to facilitate distance calculation of the included input pixels from the center of the circle;
   (h) determining coefficients of the anisotropic filter for all input pixels in the footprint from a circularly symmetric profile as a function of the distance in (g);
   (i) determining the value of the output pixel by accumulating values of the input pixels inside the footprint with coefficients determined in (h); and
   saving the value of the output pixel.

2. The method of claim 1, wherein the radii and the orientation of said ellipse are characterized via a 2×2 matrix, and wherein at least one element of said matrix is forced to be zero.

3. The method of claim 2, wherein pre-calculated values of non-zero elements of said 2×2 matrix in a subset of output pixels are surface pre-fitted, and wherein the matrix elements for an output pixel are evaluated from the fitting parameters during resampling.

4. The method of claim 1, wherein the major radius of said ellipse is aligned alongside an edge orientation perpendicular to the direction of the greatest intensity variation in the mapped input pixel position, and the lengths of the radii depend on the strength of the edge characterized by the confidence level of the edge orientation estimate.

5. The method of claim 1 wherein an elliptical footprint is used, and wherein the method uses a two-dimensional resampling filter with elliptical frequency response controlled by a matrix derived from said Jacobian matrix.

6. The method of claim 1 wherein a fixed size rectangular footprint is used, and wherein the method uses a two-dimensional resampling filter with elliptical frequency response controlled by a matrix derived from said Jacobian matrix.

7. The method of claim 1, further combining profiles of sharpening and resampling components of the filter, to produce a detail enhanced output image.

8. A digital signal processing system for optimized hardware and software implementation of single-pass digital image resampling with an anisotropic filter to transform a two-dimensional video input image having an input pixel coordinate space and input digital pixel data, into an output image having an output pixel coordinate space and output digital pixel data, said system comprising the following stages:
   (a) an input interface for obtaining two-dimensional video input digital image data for an output pixel;
   (b) a coordinates generator for mapping the output pixel coordinates onto the input image coordinate space to determine a mapped coordinate position;
   (c) a local scale estimator, coupled to said input interface and said coordinate generator, for determining the Jacobian matrix of the output pixel coordinates with respect to the input coordinates at the mapped coordinate position;
   (d) said local scale estimator, being further adapted for determining the major and minor radii and the orientation of the major radius to uniquely determine an ellipse around the mapped coordinate position, formed by two row vectors of the determined Jacobian matrix in (c);
   (e) said local scale estimator, being further adapted to extend and adjust the radii of said ellipse based on a required image quality and a required processing speed;
   (f) a footprint generator, coupled to said local scale estimator and said coordinates generator, for determining a footprint in the input image coordinate space around the mapped coordinate position, to include input pixels participating in the filtering;
   (g) a filter coefficients generator, coupled to said footprint generator and said local scale estimator, to transform the ellipse of (d) into a circle having a radius of one unit to facilitate distance calculation of the included input pixels from the center of the circle;
   (h) said filter coefficient generator, being further adapted to determine coefficients of the anisotropic filter for input pixels in the footprint from a circularly symmetric profile as a function of the distance in (g);
   (i) a filter, coupled to said filter coefficient generator and said footprint generator, to determine the value of the output pixel by accumulating values of the input pixels inside the footprint with coefficients determined in (h); and
   (j) an output interface, coupled to said filter, to save the value of the output pixel.

9. The system of claim 8, wherein said local scale estimator is adapted to characterize the radii and the orientation of said ellipse via a 2×2 matrix, and wherein at least one element of said 2×2 matrix is forced to be zero.

10. The system of claim 9, wherein pre-calculated values of non-zero elements of said 2×2 matrix in a subset of output pixels are surface pre-fitted and said local scale estimator is adapted to evaluate the matrix elements for an output pixel from the fitting parameters during resampling.

11. The system of claim 8, wherein said local scale estimator is adapted to align the major radius of said ellipse alongside an edge orientation perpendicular to the direction of the greatest intensity variation in the mapped input pixel position, and set the lengths of the radii based on the strength of the edge characterized by the confidence level of the edge orientation estimate.

12. The system of claim 8, wherein said footprint generator is adapted to use an elliptical footprint and said filter coefficients generator is adapted to use a two-dimensional resampling filter with elliptical frequency response controlled by a matrix derived from said Jacobian matrix.

13. The system of claim 8, wherein said footprint generator is adapted to use a fixed size rectangular footprint and said filter coefficients generator is adapted to use a two-dimensional resampling filter with elliptical frequency response controlled by a matrix derived from said Jacobian matrix.

14. The system of claim 8, wherein said filter coefficients generator is adapted to combine profiles of sharpening and resampling components of the resampling filter to produce a detail enhanced output image.

* * * * *